United States Patent
Zafarana et al.

[19]

[11] Patent Number: 6,078,203
[45] Date of Patent: Jun. 20, 2000

[54] NON-LINEAR VOLTAGE REGULATOR, PARTICULARLY FOR AN AUTOMOTIVE ALTERNATOR

[75] Inventors: Alessandro Zafarana, Catania; Franco Cocetta, Premariacco; Mauro Merlo, Torre d'Isola, all of Italy

[73] Assignee: SGS-Thomson Microelectronics S.r.l., Agrate Brianza, Italy

[21] Appl. No.: 09/019,893

[22] Filed: Feb. 6, 1998

[30] Foreign Application Priority Data

Feb. 7, 1997 [EP] European Pat. Off. ............. 97830044

[51] Int. Cl.[7] ................................................. H03K 5/04
[52] U.S. Cl. ........................... 327/174; 327/175; 327/552
[58] Field of Search .................................. 327/552, 551, 327/291, 172, 175, 174; 322/28

[56] References Cited

U.S. PATENT DOCUMENTS

| | | | |
|---|---|---|---|
| 4,219,769 | 8/1980 | Mcfarlane et al. | 322/28 |
| 4,580,090 | 4/1986 | Bailey et al. | 323/303 |
| 5,019,722 | 5/1991 | Hess et al. | 307/354 |
| 5,045,715 | 9/1991 | Fitch | 327/174 |
| 5,128,973 | 7/1992 | Sasaki et al. | 377/28 |
| 5,225,764 | 7/1993 | Falater | 322/28 |

FOREIGN PATENT DOCUMENTS 0690 552   1/1996   European Pat. Off. .

*Primary Examiner*—Jung Ho Kim
*Attorney, Agent, or Firm*—Jenkens & Gilchrist, P.C.; Theodore E. Galanthay

[57] ABSTRACT

A voltage regulator of the type comprising a linear filter, a comparator, and a stretcher filter which are connected in cascade with one another between an input terminal and an output terminal of the regulator. The input terminal receives an error signal as converted by the comparator into a square-wave error signal, and the output terminal deliveres a square-wave output control signal which has a stretched duty cycle over the square-wave error signal by a time delay introduced from the stretcher filter. The regulator further comprises a non-linear filtering section for the error signal which is connected between the input terminal of the regulator and the linear filter and has linear gain with the error signal below a first value, gain approximately of unity with the error signal between the first value and a second value, and zero gain with the error signal above the second value.

20 Claims, 5 Drawing Sheets

NON-LINEAR VOLTAGE REGULATOR, PARTICULARLY FOR AN AUTOMOTIVE ALTERNATOR

FIELD OF THE INVENTION

This present invention relates to voltage regulators and methods for filtering noisy electric signals.

BACKGROUND OF THE INVENTION

As is well known, a regulator for an automotive alternator is mainly to drive the excitation winding of the alternator such that a regular voltage value is obtained at the output of a voltage generator for charging the battery and, hence, power the electric utilities of the whole automobile vehicle.

The battery charging procedure depends on the type of the battery and its construction technology.

The specifications usually set for the voltage regulator of an alternator provide for:

its output voltage to lie close to a reference value;
the regulator switching frequency to be within a predetermined frequency range.

A typical precision value requirement is of 300 mV for steady-state error. Also, minimum and maximum frequencies would be set at 50 Hz and 400 Hz, respectively.

These specifications must be held for a load variation within 10% to 90% of the maximum current, and a variation of the alternator speed within 2,000 to 20,000 rpm.

In addition, the appearance of a noise signal at the alternator output, as represented by a sinusoidal function, and particularly a rectified sinus, makes these specifications quite strict. In fact, the peak-to-peak amplitude of this noise signal may be of 8–10V, and the noisy frequency range may extend from 1,200 Hz to 14,400 Hz.

Prior approaches have been aimed at reducing the amplitude of the noise signal by filtering the output voltage of the alternator through a linear filter.

In particular, a cutoff frequency of −3 dB is selected for the linear filter, as a tradeoff between an adequate filtering of the noise signal and the assurance of a minimum switching frequency of the alternator under light load conditions.

In actual practice, this tradeoff is never fully successful in filtering out the noise signal, and an additional digital filter, called a stretcher, has to be provided.

In particular, the error due to the difference between the output voltage and the reference voltage is filtered by the linear filter, and then "squared" through a comparator in order to produce a square wave, called the field control signal.

The signal applied to the comparator input is less than thoroughly filtered by the linear filter, and due to the presence of the noise signal, it is bound to produce spurious comparator switchings. The field control signal output from the comparator is input to the stretcher filter.

The stretcher filter FA, shown schematically in FIG. 1, will present, at its output terminal OUT correspondingly with a square-wave input signal S1 having a period T and duty cycle D being applied to its input terminal IN, a square-wave output signal S2 having the period T and a duty cycle $(DT+t_A)/T$, where $t_A$ is a parameter referred to as the delay of the stretcher filter FA.

Shown in FIG. 2 on a common time base t, are the patterns of the input S1 and output S2 square wave signals of the stretcher filter FA of FIG. 1.

The stretcher filter FA suppresses most of the spurious switchings, thereby reducing the switching frequency of the linear filter/stretcher filter/comparator system.

While being advantageous in several ways, this prior approach cannot suppress all of the comparator spurious switchings, and requires a stretcher filter with a non-trivial delay $t_A$.

In addition, the provision of a stretcher filter is apt to enhance the steady-state error, which is also dependent on the load being applied to the alternator and on the engine revolutions per minute.

What is needed is a voltage regulator for an alternator, which has such constructional and functional features as to ensure regulation of the switching frequency of the output control signal and accuracy of the alternator steady state, thereby overcoming the limitations with which prior art regulators have been beset.

What is also needed is a frequency filtering process of a fuzzy and non-linear type.

SUMMARY OF THE INVENTION

Accordingly, the present invention provides a voltage regulator comprising a linear filter, a comparator, and a stretcher filter which are connected in cascade with one another between an input terminal and an output terminal of the regulator, said input terminal receiving an error signal as converted by the comparator into a square-wave error signal, and said output terminal delivering a square-wave output control signal which has a stretched duty cycle over the square-wave error signal by a time delay introduced from the stretcher filter, and further comprising a non-linear filtering section for the error signal which is connected between the input terminal of the regulator and the linear filter, said non-linear filtering section having linear gain with the error signal below a first value, gain approximately of unity with the error signal between the first value and a second value, and zero gain with the error signal above the second value.

The present invention also provides a method for filtering a noisy electric signal. The method comprises a first step of linearly filtering said signal in order to reduce the noise amplitude, a second step of "squaring" the filtered signal to provide a square-wave signal having a predetermined period and predetermined duty cycle, a third step of stretching the square-wave signal to provide a stretched square-wave signal having the same period but a duty cycle $((DT+t_A)/T)$ which has been stretched by a predetermined time delay), and a preliminary step of non-linearly filtering the electric signal with a filtering characteristic which has linear gain with the electric signal below a first value, gain approximately of unity with the electric signal between the first value and a second value, and zero gain with the electric signal above the second value, and has enhanced slope across the zero value of the error signal.

The features and advantages of the present invention will be apparent from the following description of an embodiment thereof, given by way of non-limitative example with reference to the accompanying drawings.

DETAILED DESCRIPTION OF A PREFERRED EMBODIMENT OF THE INVENTION

The invention relates, particularly but non exclusively, to a voltage regulator for an automotive alternator of an automobile vehicle, for example a car, and the description to follow will make reference to this field of application for convenience of explanation.

More specifically, the present invention provides a voltage regulator of the type comprising a linear filter, a comparator, and a stretcher filter which are connected in cascade with one another between an input terminal and an output terminal of the regulator. The input terminal receives an error signal as converted by the comparator into a square-wave error signal, and the output terminal delivers a square-wave output control signal which has a stretched duty cycle over the square-wave error signal by a time delay introduced from the stretcher filter.

The present invention also provides a method of filtering a noisy electric signal, which method comprises:
- a first step of linearly filtering the signal in order to reduce the noise amplitude;
- a second step of "squaring" the filtered signal to provide a square-wave signal having a predetermined period and predetermined duty cycle;
- a third step of stretching the square-wave signal to provide a stretched square-wave signal having the same period but a duty cycle which has been stretched by a predetermined time delay.

Figure 1:
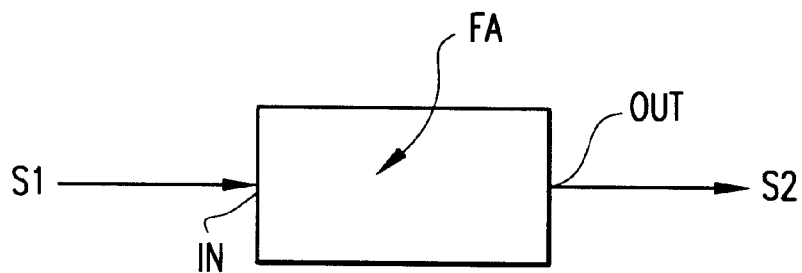
FIG. 1 shows schematically a stretcher filter according to the prior art.
Figure 2:
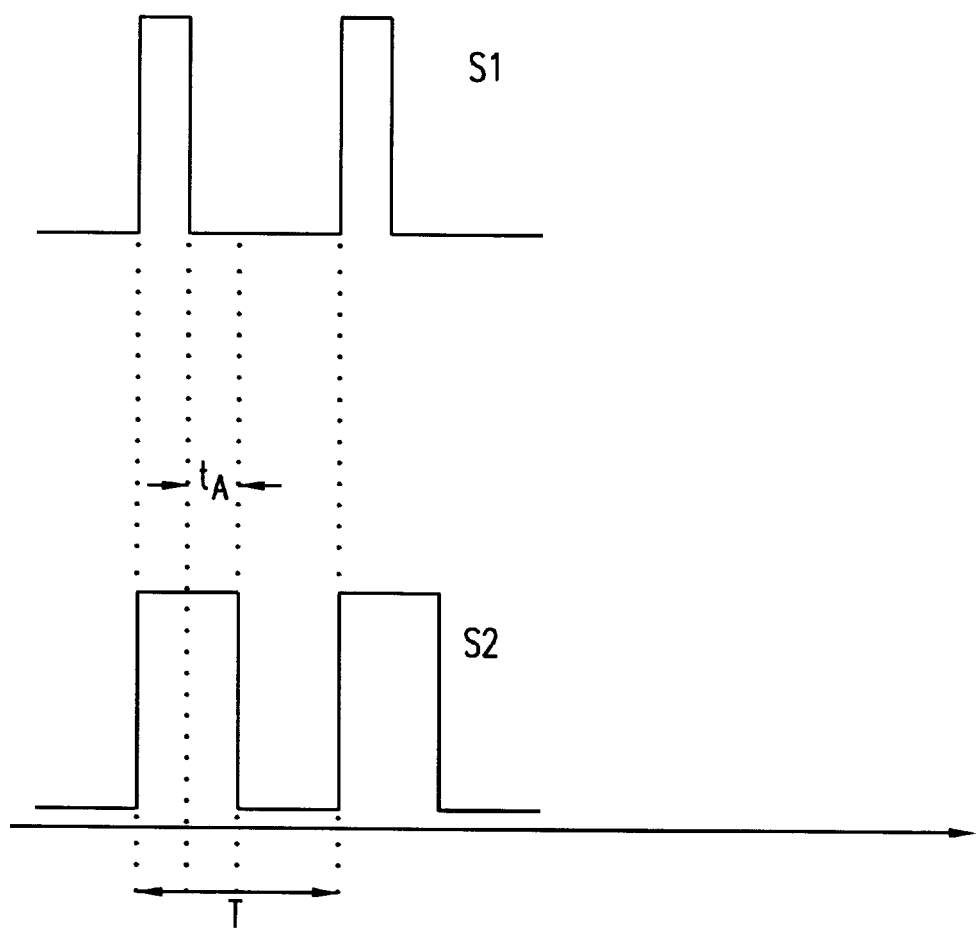
FIG. 2 shows the patterns vs time of signals related to the stretcher filter of FIG. 1.
Figure 3:
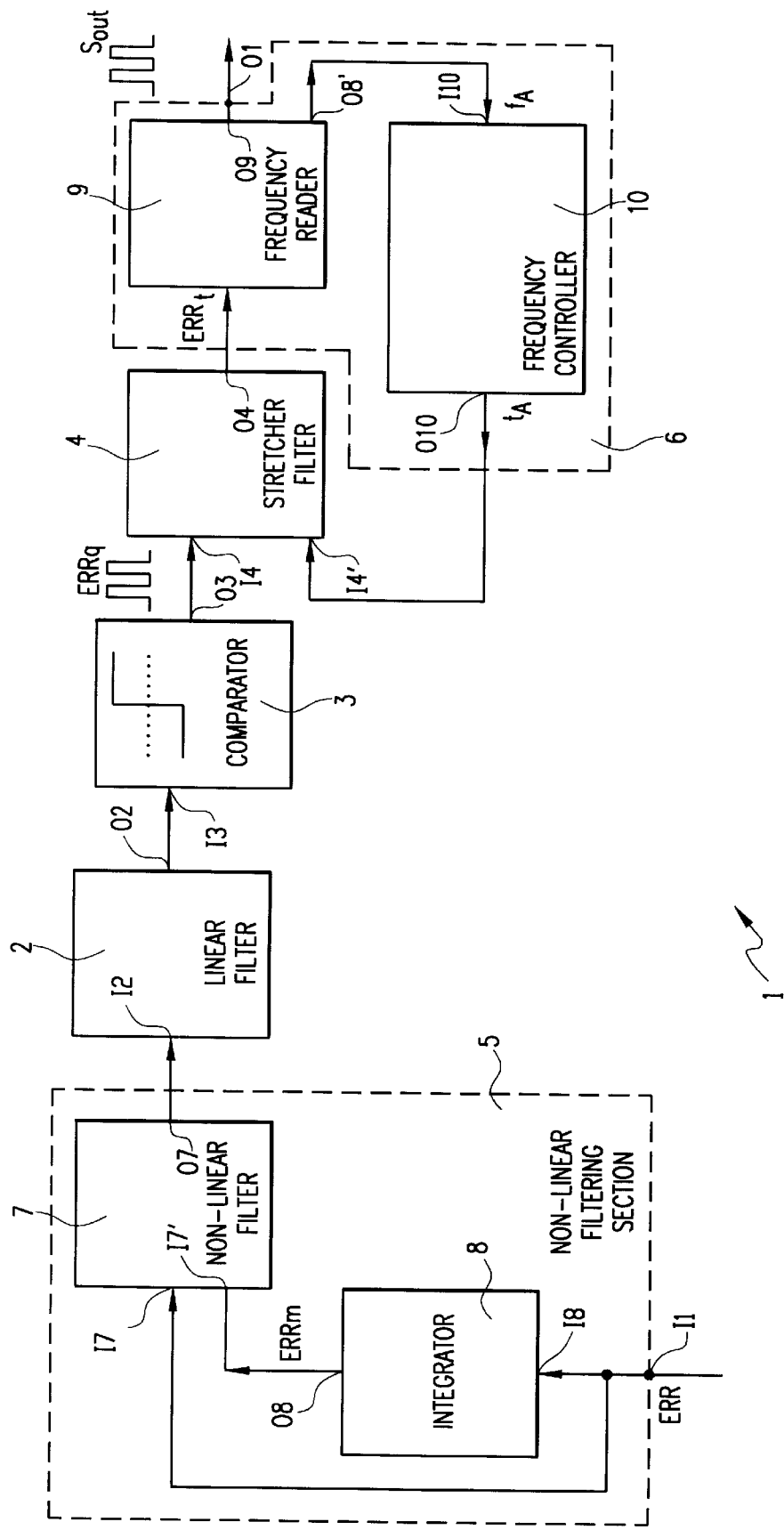
FIG. 3 shows schematically a voltage regulator according to this invention.

Referring in particular to FIG. 3, generally and schematically shown at 1 is a voltage regulator embodying this invention and intended for an automotive electric power supply, specifically of an automobile vehicle.

The regulator 1 comprises a linear filter 2, specifically of the low-pass type, a comparator 3, and a stretcher filter 4, which are connected, in cascade with one another, between an input terminal I1 and an output terminal O1 of the regulator 1.

In particular, the linear filter 2 has an input terminal I2 connected to the input terminal I1 of the regulator 1, and an output terminal O2 connected to an input terminal I3 of the comparator 3. The latter has an output terminal O3 connected to an input terminal I4 of the stretcher filter 4. The stretcher filter 4 has an output terminal O4 connected to the output terminal O1 of the regulator 1.

The above components provide similar functions to those shown for homonym components in the prior art.

An output control signal Sout is present at the output terminal O1 of the regulator 1, while the input terminal I1 is applied an error signal ERR which corresponds to the difference between an output voltage Vout of the alternator and a reference voltage Vref as set by the alternator specifications.

The error signal ERR is, therefore, substantially proportional to the noisy signal or noise affecting the regulator 1. It is filtered through the linear filter 2 and "squared" by the comparator 3, thereby providing a square-wave squared error signal ERRq.

The squared error signal ERRq is input to the stretcher filter 4, which develops, at its output terminal O4 correspondingly with a square-wave input signal ERRq having a period T and duty cycle D, a stretched square-wave output signal ERRt having the period T and a duty cycle $(DT+t_A)/T$, with $t_A$ being the delay of the stretcher filter 2.

The regulator 1 of this invention further comprises a non-linear filtering section 5 connected between the input terminal I1 of the regulator 1 and the input terminal I2 of the linear filter 2, and a frequency control section 6 connected between the output terminal O4 of the stretcher filter 4 and the output terminal O1 of the regulator 1.

In particular, the non-linear filtering section 5 comprises a non-linear filter 7 having an output terminal O7 connected to the input terminal I2 of the linear filter 2, and first I7 and second I7' input terminals connected to the input terminal I1 of the regulator 1. Further, the non-linear filtering section 5 comprises an integrator 8 having an input terminal I8 connected to the input terminal I1 of the regulator 1 and having an output terminal O8 connected to the second input terminal I7' of the non-linear filter 7.

Figure 4:
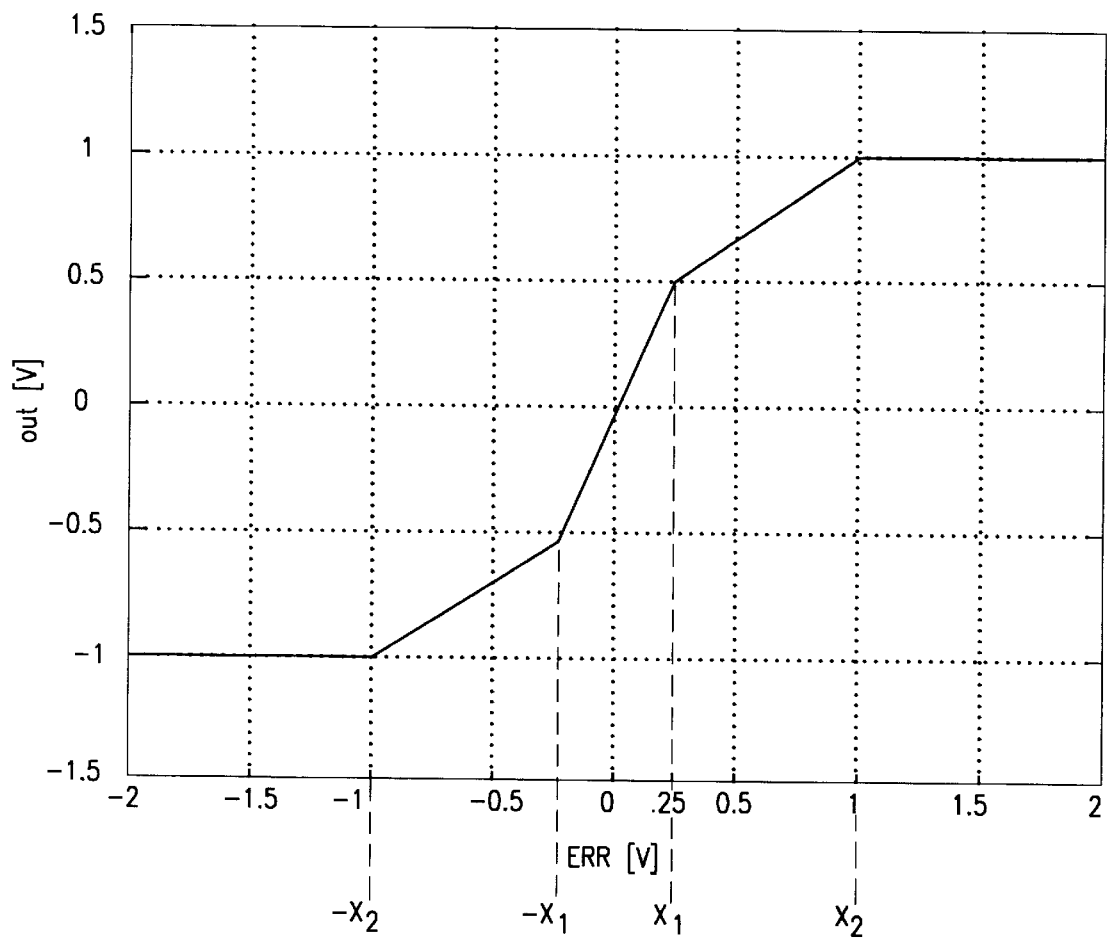
FIG. 4 shows in linear scale the pattern of the characteristics of a detail of FIG. 3.

As shown in FIG. 4, the non-linear filter 7 has a non-linear input/output characteristic.

In particular, this characteristic exhibits linear gain slope when the error signal ERR is small, i.e. below a first reference value X1, which is of 250 mV in the example of FIG. 4, approximately a gain slope of unity when the error signal ERR absolute value lies between the first reference value X1 and a second reference value X2, which is of 1V in the example of FIG. 4, and zero gain slope (i.e. the block is saturated) when the error signal ERR exceeds X2, i.e. 1V.

In addition, the characteristic of the non-linear filter 7 has, within the X1 to X2 range, enhanced gain slope across the zero value of the error signal ERR.

This increases offset sensitivity, which is the ability to "feel" the error at steady state, and improves noise rejection of the regulator 1.

Thus, according to the invention, the non-linear filter 7 provided is advantageous in that it reduces the noise amplitude at the input terminal I2 of the linear filter 2, irrespective of the alternator load and the engine rpm.

Figure 5:
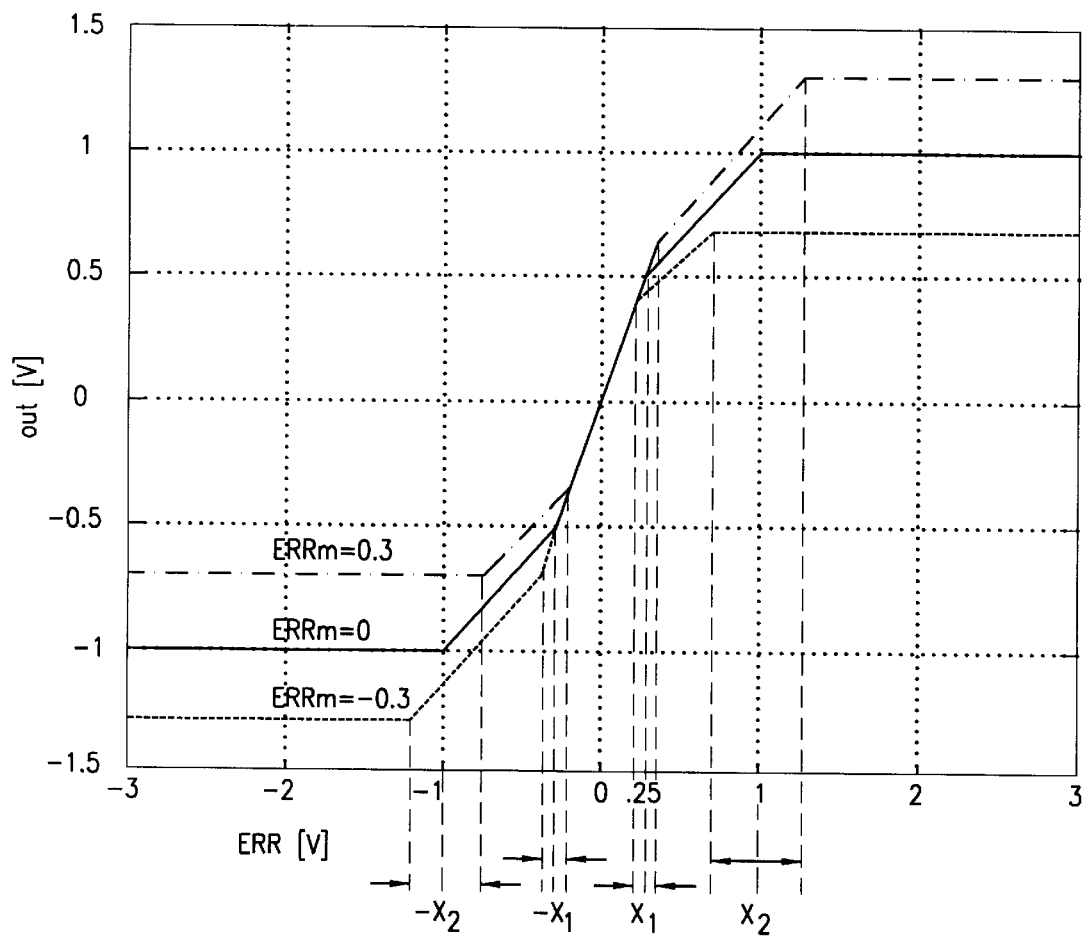
FIG. 5 shows in linear scale the pattern of the characteristic of another detail of FIG. 3.

Furthermore, to regulate the output voltage Vout for the alternator and remove the steady-state error, the non-linear filter 7 shifts the level positions to the flat region, based upon the mean error value ERRm, while retaining the gains of all the linear portions, as shown in FIG. 5, where the input/output characteristics of the non-linear filter 7 are shown in linear scale for different values of the mean error ERRm.

Notice that if the mean error ERRm is zero, the characteristic of FIG. 5 is same as that of FIG. 4.

The mean error ERRm is obtained from the integrator 8. In fact, the saturation mechanics of the voltage signal at the output of the non-linear filter 2, while affording a reduction in the amplitude of the noise, does result in loss of the information related to the continuous component that the noise signal adds to the output voltage Vout of the regulator 1; the mean error ERRm, by changing the pattern of the characteristic of the non-linear filter 2, allows this information to be recovered and provides a steady-state error which is by two orders of magnitude smaller than in conventional controllers.

The voltage regulator 1 of this invention is advantageous in having a fuzzy type of behavior.

The frequency control section 6 of the regulator 1 according to the invention comprises a frequency reader 9 having an input terminal I9 connected to the output terminal O9 of the stretcher filter 4, a first output terminal O9 connected to the output terminal O1 of the regulator 1, and a second output terminal O9' connected to the second input terminal I4' of the stretcher filter 4 via a frequency controller 10.

In particular, the frequency controller 10 has an input terminal I10 connected to the second output terminal O9' of the frequency reader 9, and an output terminal O10 connected to the second input terminal I4' of the stretcher filter 4.

The frequency controller 10 has a non-linear input/output characteristic linking the frequency $f_A$ of the output control signal Sout of the regulator 1 to the characteristic delay $t_A$ of the stretcher filter 4. Specifically, the characteristic of the frequency controller 10 shows a first flat portion below a first frequency value f1, a second linear portion with a first slope between the first frequency value f1 and a second frequency value f2, a third linear portion with a second slope between the second frequency value f2 and a third frequency value f3, and a fourth flat portion above said third frequency value f3.

Figure 6:
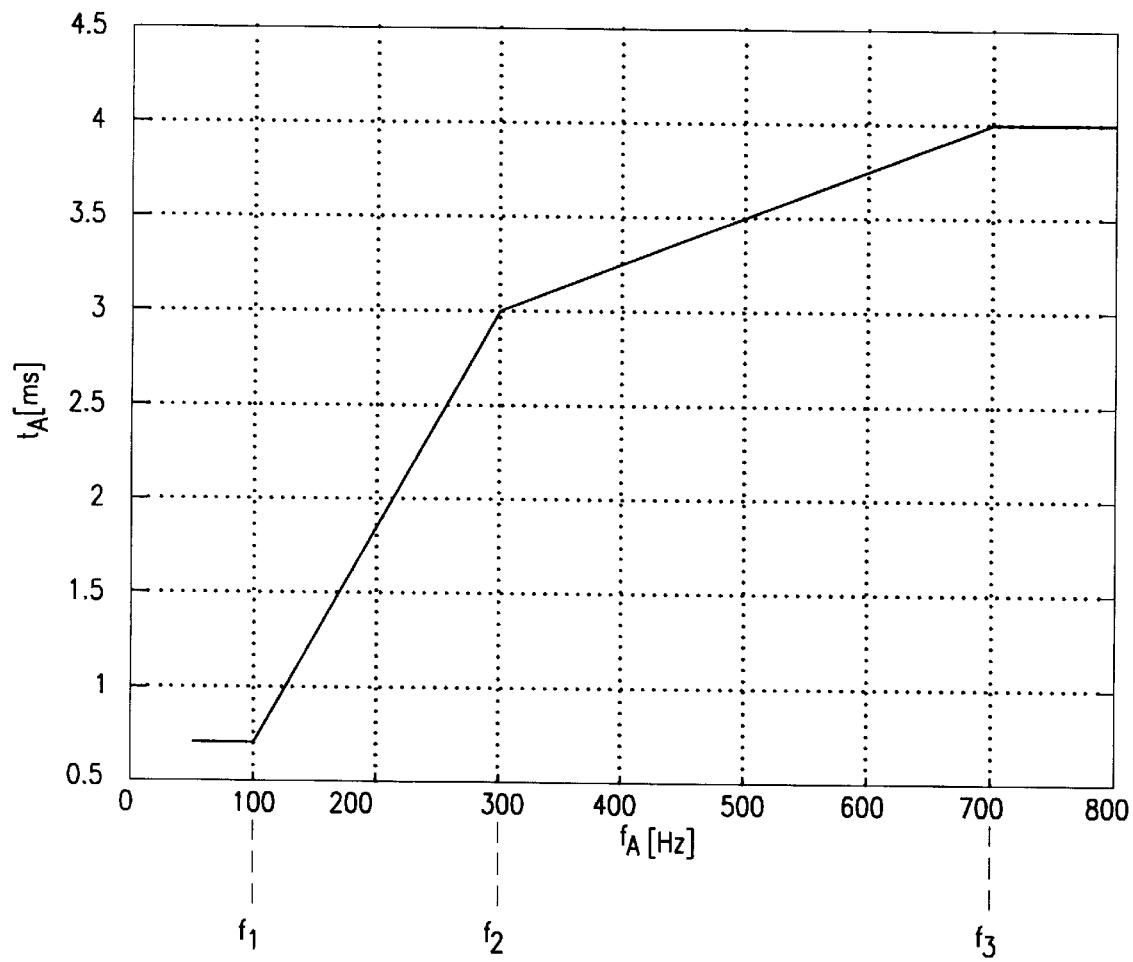
FIG. 6 shows in linear scale the patterns of the characteristic of FIG. 5 under different operating conditions.

In the example shown in FIG. 6, f1 is 100 Hz, f2 is 300 Hz, and f3 is 700 Hz. In addition, in this invention, the first slope (between f1 and f2) is advantageously greater than the second slope (between f2 and f3).

This non-linear characteristic allows the frequency $f_A$ to be controlled from a minimum of 70 Hz to a maximum of 160 Hz for all the load values and all the engine rpm values. Concurrently therewith, a non-zero delay $t_A$ for the stretcher filter 4 will avoid the phenomenon of spurious switchings of the comparator 3.

According to the invention, such spurious switchings of the comparator 3 are advantageously removed completely even for minimal delays $t_A$ of the stretcher filter 4 by the provision of the non-linear filtering section 5 for the input noise signal.

In conclusion, the regulator of this invention ensures regulation of the switching frequency of the comparator 4 and full accuracy of the regulator at steady state. In addition, it can be implemented in a fully analog and integratable form.

Finally, with regulators which involve no specifications as to minimum and maximum switching frequencies, only the nonlinear filtering section 5 may be provided, using an stretcher filter 4 with a fixed delay $t_A$.

While the invention has been particularly shown and described with reference to specific embodiments thereof, it will be understood by those skilled in the art that various changes in form and detail may be made thereto, and that other embodiments of the present invention beyond embodiments specifically described herein may be made or practice without departing from the spirit and scope of the present invention as limited solely by the appended claims.

What is claimed is:

1. A voltage regulator comprising a linear filter, a comparator, and a stretcher filter which are connected in cascade with one another between an input terminal and an output terminal of the regulator, said input terminal receiving an error signal which is converted by the comparator into a square-wave error signal, and said output terminal delivering a square-wave output control signal which has a stretched duty cycle relative to the duty cycle of the square-wave error signal by a time delay introduced from the stretcher filter, and further comprising a non-linear filtering section for the error signal which is connected between the input terminal of the regulator and the linear filter, said non-linear filtering section having linear gain slope with the error signal below a first reference value, gain slope approximately of unity with the error signal between the first reference value and a second reference value, and zero gain slope with the error signal above the second reference value.

2. A voltage regulator according to claim 1, wherein said non-linear filtering section comprises a non-linear filter having an output terminal connected to the linear filter, and first and second input terminals, the first input terminal of the non-linear filter connected to the input terminal of the regulator.

3. A voltage regulator according to claim 2, wherein said non-linear filtering section further comprises an integrator having an input terminal connected to the input terminal of the regulator and an output terminal connected to the second input terminal of the non-linear filter.

4. A voltage regulator according to claim 3, wherein said non-linear filter shifts the first and second reference values based upon a mean error value supplied from the integrator, the mean error value being applied to the output terminal of the integrator by the integrator and based upon the error signal.

5. A voltage regulator according to claim 1, further comprising a frequency control section connected between the stretcher filter and the output terminal of the regulator and having an output terminal connected to an input terminal of the stretcher filter, said frequency control section controlling the time delay from the stretcher filter according to a switching frequency of the square-wave output control signal.

6. A voltage regulator according to claim 5, wherein said frequency control section comprises a frequency controller and a frequency reader having an input terminal connected to the output terminal of the stretcher filter, a first output terminal connected to the output terminal of the regulator, and a second output terminal connected to an input terminal of the frequency controller.

7. A voltage regulator according to claim 6, wherein said frequency controller has a non-linear input/output characteristic.

8. A voltage regulator according to claim 7, wherein the input/output characteristic of the frequency controller has a first linear portion below a first value of the switching frequency of the output control signal, a second linear portion with a first slope between the first value and a second value of the switching frequency of the output control signal, a third linear portion with a second slope between the second value and a third value of the switching frequency of the output control signal, and a fourth linear portion above the third value of the switching frequency of the output control signal.

9. A voltage regulator according to claim 8, wherein said first slope of the input/output characteristic of the frequency controller is greater than said second slope.

10. A method for filtering an error signal, said method comprises:
    a first step of linearly filtering said error signal in order to reduce noise amplitude on said error signal so as to generate a filtered signal;
    a second step of squaring the filtered signal to provide a square-wave signal having a predetermined period and predetermined duty cycle;
    a third step of stretching the square-wave signal to provide a stretched square-wave signal having the same period as the period of the square-wave signal and a duty cycle $((DT+t_A)/T)$ which has been stretched by a predetermined time delay; and
    a preliminary step of non-linearly filtering the error signal prior to the first step, with a filtering characteristic, based upon said error signal which has linear gain slope with the error signal below a first reference value, gain slope approximately of unity with the error signal between the first reference value and a second reference value, and approximately zero gain slope with the error signal above the second reference value, and has enhanced gain slope relative to the gain slope approximately of unity across the zero value of the error signal.

11. The method according to claim 10, wherein said preliminary non-linear filtering step comprises the step of shifting the first and second reference values based upon a mean error value of the error signal.

12. The method according to claim 10, further including a final frequency controlling step for regulating generating the predetermined time delay according to a switching frequency corresponding to the stretched square-wave signal.

13. The method according to claim 12, wherein said predetermined time delay generated during said final frequency controlling step is developed in a non-linear manner.

14. The method according to claim 13, wherein said final frequency controlling step yields a relationship between the predetermined time delay and the switching frequency having a first portion having zero slope, a second linear portion and a third linear portion having different slopes, and a fourth portion having zero slope.

15. The method according to claim 14, wherein the first flat portion occurs below a first reference value of the switching frequency of the output control signal, the second linear portion occurs between the first and second reference values, the third linear portion occurs between the second reference value and a third reference value, and the fourth flat portion occurs above said third reference value.

16. The method according to claim 15, wherein the slope of the second linear portion is greater than the slope of the third linear portion.

17. The method according to claim 10, further including the step of integrating said error signal before the preliminary step of non-linearly filtering the error signal to develop a mean error value.

18. A non-linear voltage regulator for filtering an error signal, said non-linear voltage regulator comprising:

a non-linear filter, said non-linear filter having a first and a second input terminal;

an integrator for integrating said error signal to produce an integrated error signal, wherein said error signal is applied to said first input terminal of said non-linear filter and said integrated error signal is applied to said second input terminal of said non-linear filter; and means for extending a duty cycle of a square wave by operating on a signal derived from an output of said non-linear filter.

19. The non-linear voltage regulator according to claim 18, wherein said means for extending said duty cycle of said square wave increases said duty cycle by a time delay added to each high logic level of said square wave.

20. The non-linear voltage regulator according to claim 18, further comprising a frequency controller for generating a time delay based upon a signal containing a square wave operating at a certain frequency.

* * * * *